United States Patent
Ohashi et al.

(10) Patent No.: US 10,725,186 B2
(45) Date of Patent: Jul. 28, 2020

(54) SCINTILLATOR PLATE, RADIATION DETECTOR, AND RADIATION MEASUREMENT SYSTEM

(71) Applicant: CANON KABUSHIKI KAISHA, Tokyo (JP)

(72) Inventors: Yoshihiro Ohashi, Tokyo (JP); Nobuhiro Yasui, Yokohama (JP); Toru Den, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 45 days.

(21) Appl. No.: 16/077,592

(22) PCT Filed: Feb. 14, 2017

(86) PCT No.: PCT/JP2017/005260
§ 371 (c)(1),
(2) Date: Aug. 13, 2018

(87) PCT Pub. No.: WO2017/145858
PCT Pub. Date: Aug. 31, 2017

(65) Prior Publication Data
US 2019/0033472 A1    Jan. 31, 2019

(30) Foreign Application Priority Data
Feb. 23, 2016 (JP) .................. 2016-031747

(51) Int. Cl.
*G01T 1/202* (2006.01)
*G01T 1/20* (2006.01)

(52) U.S. Cl.
CPC ............ *G01T 1/2023* (2013.01); *G01T 1/202* (2013.01); *G01T 1/2018* (2013.01)

(58) Field of Classification Search
CPC ............................. G01T 1/2018; G01T 1/202
See application file for complete search history.

(56) References Cited

U.S. PATENT DOCUMENTS 6,800,857 B2   10/2004   Kajiwara et al.
7,070,855 B2   7/2006    Fukutani et al.
(Continued)

FOREIGN PATENT DOCUMENTS

JP   2002-139569 A   5/2002
JP   2002-513469 A   5/2002
(Continued)

OTHER PUBLICATIONS

Notice of Reasons for Refusal in Japanese Application No. 2016-031747 dated (Feb. 2020).

*Primary Examiner* — Michael C Bryant
(74) *Attorney, Agent, or Firm* — Venable LLP

(57) ABSTRACT

Provided is a scintillator plate, including a plurality of scintillator crystals each including a plurality of first phases and a second phase present on a periphery of each of the plurality of first phases, in which the each of the plurality of first phases and the second phase are different from each other in refractive index with respect to scintillation light, the adjacent scintillator crystals are joined to each other through intermediation of an adhesive layer, and at least a part of an extension line of a center axis of the each of the plurality of first phases of the adjacent scintillator crystals passes through the adhesive layer.

17 Claims, 6 Drawing Sheets

(56) References Cited

U.S. PATENT DOCUMENTS

| | | | |
|---|---|---|---|
| 7,074,480 B2 | 7/2006 | Fukutani et al. | |
| 7,377,701 B2 | 5/2008 | Kajiwara et al. | |
| 7,421,170 B2 | 9/2008 | Kajiwara et al. | |
| 7,879,734 B2 | 2/2011 | Fukutani et al. | |
| 8,009,797 B2 | 8/2011 | Ouchi et al. | |
| 8,340,243 B2 | 12/2012 | Ouchi et al. | |
| 8,520,799 B2 | 8/2013 | Nagai et al. | |
| 8,537,966 B2 | 9/2013 | Ouchi et al. | |
| 8,559,594 B2 | 10/2013 | Ouchi et al. | |
| 8,586,931 B2 | 11/2013 | Horie et al. | |
| 8,618,489 B2 | 12/2013 | Ohashi et al. | |
| 8,648,311 B2 | 2/2014 | Kobayashi et al. | |
| 8,669,527 B2 | 3/2014 | Horie et al. | |
| 8,681,934 B2 | 3/2014 | Nagai et al. | |
| 9,068,111 B2 * | 6/2015 | Ohashi | C04B 35/117 |
| 9,080,102 B2 | 7/2015 | Ohashi et al. | |
| 9,110,176 B2 | 8/2015 | Oike et al. | |
| 9,134,437 B2 | 9/2015 | Iwasaki et al. | |
| 9,360,566 B2 | 6/2016 | Saito et al. | |
| 9,885,791 B2 | 2/2018 | Yasui et al. | |
| 2004/0252955 A1 | 12/2004 | Kajiwara et al. | |
| 2011/0139991 A1 * | 6/2011 | Menge | G01T 1/20 |
| | | | 250/361 R |
| 2013/0026374 A1 * | 1/2013 | Saito | G01T 1/202 |
| | | | 250/366 |
| 2014/0084167 A1 | 3/2014 | Ohashi et al. | |

FOREIGN PATENT DOCUMENTS

| | | |
|---|---|---|
| JP | 2002-333480 A | 11/2002 |
| JP | 2013-24833 A | 2/2013 |
| JP | 2015-111107 A | 6/2015 |
| WO | 98/35242 A1 | 8/1998 |
| WO | 2010/050483 A1 | 5/2010 |
| WO | 2013/015454 A2 | 1/2013 |

* cited by examiner

SCINTILLATOR PLATE, RADIATION DETECTOR, AND RADIATION MEASUREMENT SYSTEM

TECHNICAL FIELD

The present invention relates to a scintillator plate, a radiation detector, and a radiation measurement system.

BACKGROUND ART

In radiography which acquires an image by applying radiation to an object and detecting radiation having passed through the object, digital radiography (DR) which acquires an image by converting the detected radiation into an electrical signal is popular. In general, in DR, a flat panel detector (FPD) is used. The FPD includes a light receiving element having two-dimensionally arranged pixels and a scintillator layer formed on a surface of the light receiving element.

Depending on the application, in most cases, a wide image pickup area of several tens of centimeters or more per side is required for the FPD, and thus, the scintillator layer to be formed is required to have a large area. Therefore, the scintillator layer is formed by using vacuum deposition which enables formation of a large-area layer or an application method of applying a binding agent having scintillator particles dispersed therein.

In particular, a scintillator layer formed by depositing cesium iodide (CsI) has an advantage that a high positional resolution may be obtained because when cesium iodide is grown as needle crystals, crosstalk is suppressed by light guiding in the needle crystals. However, adjacent CsI needle crystals are liable to adhere to each other, and this adhesion degrades the waveguiding property of scintillation light, to thereby decrease the resolution of a radiation detector.

In PTL 1, there is proposed that a structure including two crystal phases having different refractive indices be used as a scintillator layer. This structure is a phase separation crystal including a plurality of first phases (cylinder phases) having unidirectionality, and a second phase (matrix phase) present on the periphery of each of the first phases, and scintillation light emitted by the first phases or the second phase is confined in the phase having a higher refractive index. With this, the scintillation light is guided in an extending direction of the first phases. Therefore, when this structure is used as a scintillator layer, a high resolution can be obtained.

In the above-mentioned structure, the second phase is present between the first phases, and hence the adhesion of the first phases is less liable to occur as compared to the adhesion between the CsI needle crystals. Thus, it is conceivable that a higher resolution is obtained through use of the phase separation crystals as the scintillator layer instead of the CsI needle crystals.

In order to produce such a scintillator layer including a phase separation crystal in which two crystal phases having different refractive indices are completely separate from each other, it is conceivable to employ a technique of micromachining a scintillator crystal, a technique of separating two phases of eutectic composition in one axial direction and growing the two phases, or the like.

However, it is technically difficult to obtain by those techniques a phase separation crystal having a large area of several tens of centimeters per side. In order to use a phase separation crystal as a scintillator layer of an FPD, it is necessary to spread (tile) a plurality of phase separation crystals, each of which is processed to have a predetermined shape, over a surface of a light receiving element in order to secure a large image pickup area.

In tiling, slight clearance is formed between adjacent phase separation crystals due to limitations on the processing accuracy. This clearance reaches about several μm to about several tens of μm depending on the processing accuracy. When the clearance is filled with a medium having an appropriate refractive index of reducing reflection and scattering of light as in PTL 1, an amount of an X-ray entering pixels arranged in the clearance can be increased to reduce the influence on an X-ray image.

CITATION LIST

Patent Literature

PTL 1: Japanese Patent Application Laid-Open No. 2013-24833

SUMMARY OF INVENTION

Technical Problem

When the clearance between the scintillator crystals is filled with a medium having an appropriate refractive index as described in PTL 1, the influence on an X-ray image can be reduced. However, it is conceivable that it may be difficult to fill an appropriate medium into the clearance depending on the refractive indices of the first phases and the second phase of the scintillator crystals.

It is an object of the present invention to provide a scintillator plate, a radiation detector, and a radiation measurement system including the radiation detector, which are capable of reducing the influence of the clearance between scintillator crystals on an X-ray image by elaborating the arrangement of the scintillator crystals to be tiled in a scintillator having a structure including two crystal phases having different refractive indices.

Solution to Problem

According to one embodiment of the present invention, there is provided a scintillator plate including a plurality of scintillator crystals each including a plurality of first phases and a second phase present on a periphery of each of the plurality of first phases, in which the each of the plurality of first phases and the second phase are different from each other in refractive index with respect to scintillation light, the adjacent scintillator crystals are joined to each other through intermediation of an adhesive layer, and at least a part of an extension line of a center axis of the each of the plurality of first phases of the adjacent scintillator crystals passes through the adhesive layer. The other embodiments of the present invention are described in Description of the Embodiments.

Further features of the present invention will become apparent from the following description of exemplary embodiments with reference to the attached drawings.

DESCRIPTION OF EMBODIMENTS

Figure 1:
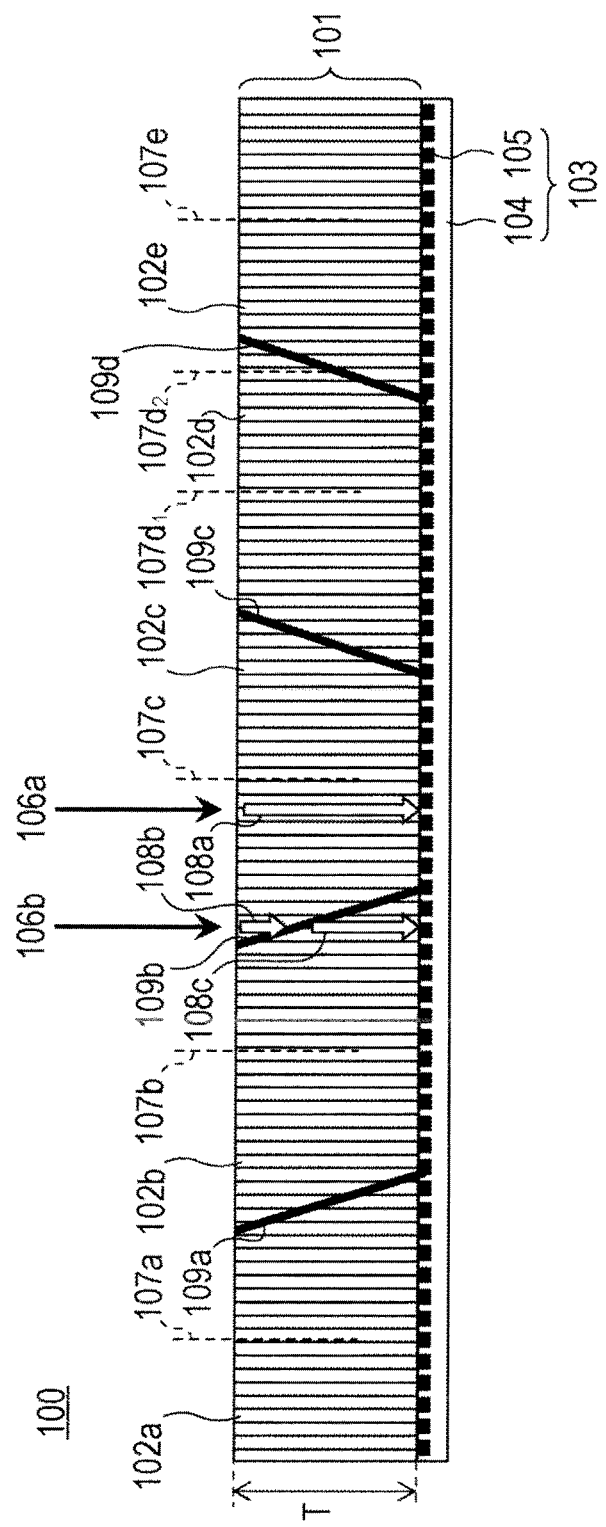
FIG. 1 is a schematic view of a radiation detector according to one embodiment of the present invention.

Preferred embodiments of the present invention will now be described in detail in accordance with the accompanying drawings.

A scintillator plate according to one embodiment of the present invention includes a plurality of scintillator crystals. Each of the plurality of scintillator crystals has the above-mentioned phase separation structure, and scintillation light is guided in an extending direction of a first phase.

The scintillator plate includes a plurality of scintillator crystals each including a plurality of first phases and a second phase present on the periphery of each of the plurality of first phases. It is preferred that the clearance between the plurality of first phases be filled with the second phase. The first phase and the second phase are different in refractive index with respect to scintillation light. The refractive index of the first phase refers to the refractive index of a material forming the first phase, and the refractive index of the second phase refers to the refractive index of a material forming the second phase. The scintillator crystals are joined to each other through intermediation of an adhesive layer.

When one scintillator crystal is paid attention to, the plurality of first phases are present, and an axis (orientation) being the center of gravity of the center axis of each of the plurality of first phases is defined as the center axis of the scintillator crystal. The center axis of the scintillator crystal represents the orientation, and a plurality of center axes are present in the scintillator crystal. The center axis of the scintillator crystal passing through a certain point thereof is held in contact with the adhesive layer, and an extension line further extending from the center axis toward the adhesive layer side passes through the adhesive layer.

It is not necessarily required that all the extension lines of the center axes of the first crystal phases passing through arbitrary points in the scintillator crystal pass through the adhesive layer, and it is sufficient that at least a part of the extension lines pass through the adhesive layer. For example, a center axis of the scintillation crystal and an extension line $107d_2$ thereof illustrated in FIG. 1 do not pass through adhesive layers 109c and 109d, but a center axis of the scintillator crystal and an extension line $107d_2$ thereof pass through the adhesive layer 109d. Thus, in the scintillator plate illustrated in FIG. 1, a scintillator crystal 102d is regarded that at least a part of the extension lines of the center axes thereof passes through the adhesive layer.

In the case of the above-mentioned arrangement, the center axis of the above-mentioned adhesive layer and the center axis of the crystal cross each other, and the adhesive layer is tilted with respect to the center axis of the crystal. Further, when the scintillator plate is used as a radiation detector, the above-mentioned adhesive layer is tilted with respect to the incident direction of radiation.

In the scintillator plate of the radiation detector described in PTL 1, an adhesive layer between the scintillator crystals is arranged in substantially parallel to the incident direction of radiation. Thus, the clearance has an influence on pixels right below the clearance and surrounding pixels thereof.

Meanwhile, when the adhesive layer is tilted with respect to the incident direction of radiation as in the present embodiment, as compared to the case where the extending direction is parallel to the incident direction, the influence of the clearance can be shared by a large number of pixels, and the influence of the clearance on a photographed image can be even more reduced. Further, a dead region can be reduced when the adhesive layer is tilted with respect to the incident direction of radiation.

For example, when radiation perpendicularly enters the scintillator plate of the radiation detector described in PTL 1, the radiation having entered the clearance between the scintillator crystals is not converted into scintillation light and passes through the clearance as the radiation to a light receiving element.

Meanwhile, in the case where the scintillator crystals are tiled so that the adhesive layer is tilted with respect to the center axis of the crystal as in the present embodiment, when radiation enters the clearance between the scintillator crystals on the surface of the scintillator plate, the radiation passes through the adhesive layer to enter the scintillator crystal arranged on a downstream side of the adhesive layer and is converted into scintillation light to be detected by a light receiving element. Thus, the scintillator plate according to the present embodiment can reduce or eliminate the dead region.

Now, the present embodiment is specifically described with reference to the drawings and the like.

Figure 2:
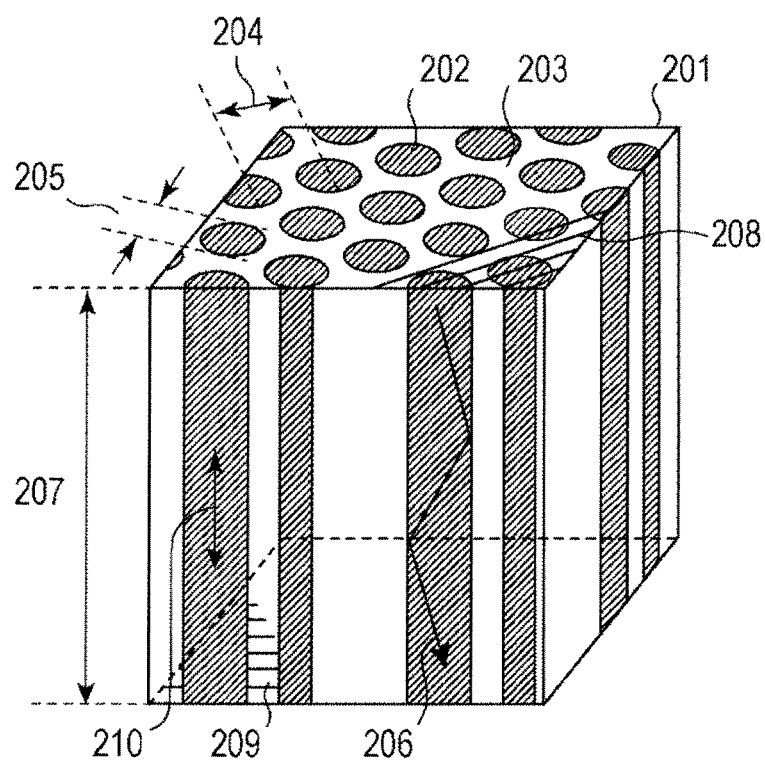
FIG. 2 is a schematic view of an example of a scintillator crystal according to one embodiment of the present invention.

FIG. 1 is a schematic view of a radiation detector 100 according to the present embodiment. The radiation detector 100 includes a scintillator plate 101 configured to convert radiation 106 (106a, 106b) into scintillation light, and a detection unit 103 configured to detect the scintillation light from the scintillator plate 101. The scintillator plate 101 includes a plurality of scintillator crystals 102 (102a to 102e). Each of the scintillator crystals 102 (102a to 102e) includes a plurality of first phases 202 and a second phase 203 present on the periphery of each of the first phases 202 as illustrated in FIG. 2, and the scintillation light is guided in the extending direction of the first phases 202. Further, in FIG. 1, adhesive layers 109 (109a to 109d) are formed between the adjacent scintillator crystals 102. The center axes of the respective scintillator crystals 102 (102a to 102e) are denoted by reference symbols 107 (107a to 107e). For ease of viewing, a part of an extension line extending from the center axis toward the radiation incident direction (upper direction on the drawing sheet) is also denoted by reference symbol 107 (center axis) in FIG. 1.

The detection unit 103 includes a substrate 104 and light receiving elements 105 arranged in two directions on the substrate 104, and each light receiving element 105 is configured to detect the intensity of light having entered a light receiving surface thereof.

Here, the radiation 106 (106a, 106b) is regarded as perpendicularly entering the radiation detector 100, and the radiation 106 (106a, 106b) entering the scintillator crystals 102b and 102c and the adhesive layer 109b between the scintillator crystals 102b and 102c are considered.

The incident direction of the radiation 106a is matched with the center axis 107c of the scintillator crystal 102c, and emitted light 108a is detected by the detection unit 103.

Meanwhile, regarding the radiation 106b entering a region including the adhesive layer 109b, emitted light 108b is first generated by the scintillator crystal 102c. Then, the emitted light 108b is guided along the center axis 107c of the scintillator crystal 102c and guided into the scintillator crystal 102b through the adhesive layer 109b.

The guided light is guided along the center axis 107b of the scintillator crystal 102b together with emitted light 108c generated by the scintillator crystal 102b, and detected by the detection unit 103. As a result, a dead region with respect to X-rays, which corresponds to the adhesive layer 109b, is divided into a plurality of pixels, and a defective pixel is not generated.

As described above, when the extension line extending from the center axis of the two adjacent scintillator crystals passes through the adhesive layer, and the adhesive layer is tilted with respect to the incident direction of radiation, the emitted light of the scintillator crystal arranged on an upstream side of the travelling direction of the radiation is guided to the scintillator crystal arranged on a downstream side thereof.

The same also applies to the adhesive layers between the scintillator crystals 102a and 102b, the scintillator crystals 102c and 102d, and the scintillator crystals 102d and 102e, and there is obtained a scintillator plate which does not have a dead region with respect to incident X-rays over the entire region of a scintillator.

FIG. 2 is a schematic view of a specific example of a scintillator crystal 201. The scintillator crystal 201 has a phase separation structure including a plurality of first phases 202 and a second phase 203 present on the periphery of each of the first phases 202.

The scintillator crystal 201 has a first surface 208 and a second surface 209, and the first phases 202 extend from the first surface 208 to the second surface 209. The first surface 208 serves as a radiation irradiation surface, and the second surface 209 serves as a light extraction surface. Radiation enters the first surface 208, and scintillation light is extracted from the second surface 209 to the light receiving elements.

At least one of the first phase and the second phase is a light emitting phase for converting at least a part of incident radiation into scintillation light. Further, the first phase 202 and the second phase 203 have different refractive indices. Thus, while the scintillation light is confined in a higher refractive index phase having a relatively high refractive index, the scintillation light is guided from the first surface 208 to the second surface 209 and from the second surface 209 to the first surfaced 208 of the scintillator crystal 201 having a thickness 207.

It is conceivable that a higher resolution is provided when the scintillation light is guided in a phase in which the scintillation light is generated. Therefore, it is preferred that a higher refractive index phase having a relatively high refractive index serve as a light emitting phase. In this case, a lower refractive index phase having a relatively low refractive index may or may not serve as a light emitting phase. The case where the first phase 202 is a higher refractive index phase and serves as a light emitting phase is hereinafter exemplified.

When the first phase 202 is a higher refractive index phase, the scintillation light is guided between the first surface 208 and the second surface 209 while being confined in the first phase 202, as in an optical fiber. The first phase 202 has a cylindrical shape.

Of the scintillation light generated in the first phase 202, scintillation light 206 that enters the boundary surface between the first phase 202 and the second phase 203 at a critical angle or more is guided through the first phase 202 in a waveguiding direction 210 while repeating total reflection and output from the first surface 208 or the second surface 209.

Here, the waveguiding direction 210 of the scintillation light is the extending direction (longitudinal direction) of the first phase 202 and is a direction parallel to the center axis of the scintillation light. When the diameter of the first phase 202 is smaller than the wavelength of the guided emitted light, the scintillation light is not reflected from the boundary surface between the first phase 202 and the second phase 203, and a larger amount of component passes through the boundary surface. Thus, it is desired that a period 204 and a diameter 205 of the first phase 202 be larger than the wavelength of the scintillation light. However, it is not required that the diameters and the periods of all of the first phases 202 be larger than the wavelength of the scintillation light. Even when a few first phases 202 have a diameter and a period that are smaller than the wavelength of the scintillation light, the waveguiding property of the scintillation light is hardly influenced.

It is also assumed that, as a scintillator having a phase separation structure, a scintillator having light emission within an ultraviolet range of from 300 nm is used. Therefore, it is desired that the diameter 205 of the first phase 202 be 300 nm or more.

Further, when the diameter 205 of the first phase 202 is larger than the length of a diagonal of one pixel (pixel size) of the light emitting element 105, the influence of confinement of light in one pixel is degraded. Therefore, it is desired that the upper limit value of the diameter 205 of the first phase 202 be smaller than the pixel size. The pixel size may be any size, and hence the preferred range of the diameter 205 of the first phase 202 varies depending on the pixel size of a light emitting element to be used.

In view of the foregoing, it is preferred that the diameter 205 of the first phase 202 fall within a range of from 300 nm to the pixel size.

The above-mentioned scintillator having a waveguiding function like an optical fiber has a high resolution (also called a space resolution), and a high-resolution sensor having a pixel size of about 2 μm may also be used. In this case, when the diameter of the fiber is more than 2 μm, light leaks to an adjacent pixel. Therefore, it is desired that the diameter of the first phase 202 be 2 μm or less.

Further, the shape of the first phase 202 is not limited to a cylindrical shape, and may be, for example, a polygonal column. In this case, the largest width of the first phase 202 (width in a diagonal direction when the first phase 202 has a shape of, for example, a quadrangular prism) corresponds to the above-mentioned diameter.

It is preferred that the first phase 202 linearly continue from the first surface 208 to the second surface 209. However, the following may also be possible: the first phase 202 is disconnected or branched in the middle; a plurality of crystal phases are integrated; the diameter of the crystal phase changes; and the first phase 202 is not linear and includes a non-linear portion. It is preferred that the second phase 203 be present continuously from the first surface 208 to the second surface 209 and that the clearance between the first phases 202 be filled with the second phase 203.

There is no particular limitation on the difference in refractive index between the first phase 202 and the second phase 203. However, it is preferred that the difference in refractive index be large because the critical angle can be reduced in that case based on the Snell's law. For example, a value (also called a refractive index ratio) obtained by dividing the refractive index of a lower refractive index phase by the refractive index of a higher refractive index phase is preferably 0.95 or less, more preferably 0.9 or less. The refractive index of the lower refractive index phase or the higher refractive index phase is defined as a refractive index of the material of the lower refractive index phase or the higher refractive index phase at a center wavelength of the scintillation light.

As the scintillator crystal having the structure illustrated in FIG. 2, for example, a scintillator having a eutectic phase separation structure may be used. The eutectic phase separation structure refers to a phase separation structure as illustrated in FIG. 2 in which the first phase and the second phase form a eutectic.

As an example of a material system of the eutectic phase separation structure, there is given a eutectic phase separation structure of a perovskite-type oxide material containing Gd ($GdAlO_3$) and alumina ($Al_2O_3$). In the eutectic phase separation structure of this material system, a first phase ($GdAlO_3$ having a refractive index of 2.05) has a refractive index higher than that of a second phase ($Al_2O_3$ having a refractive index of 1.79), and the first phase serves as a scintillator. Therefore, of eutectic phase separation structures, the above-mentioned eutectic phase separation structure has a particularly high waveguiding property.

In the case of the eutectic phase separation structure, the first phase is a crystal of a first material, and the second phase is a crystal of a second material. What is important for forming a eutectic phase separation structure including two phases of a first phase and a second phase, which is present on the periphery of the first phase and covers the side surface of the first phase, is a composition ratio between the material forming the first phase and the material forming the second phase.

In order to obtain a scintillator crystal having the phase separation structure of good quality as illustrated in the schematic view of FIG. 2, it is generally necessary that the material of the first phase and the material of the second phase have a eutectic composition ratio (for example, $GdAlO_3$:$Al_2O_3$=46:54 (mol %)). However, the composition ratio between the material of the first phase and the material of the second phase is not necessarily required to be strictly the eutectic composition ratio. As long as the composition ratio is near the eutectic composition ratio, a eutectic can be produced. The allowable range of the composition ratio can be substantially set to a range of eutectic composition ±5 mol % with respect to the composition ratio although the range changes depending on the production method of the eutectic.

That is, when a eutectic phase separation structure of $GdAlO_3$ and $Al_2O_3$ is intended to be formed, it is preferred that the composition ratio of those materials be $GdAlO_3$:$Al_2O_3$=41:59 to 51:49 (mol %). Further, it is more preferred that the composition ratio between the material of the first phase and the material of the second phase fall within a range of eutectic composition ±3 mol %.

A crystal having the phase separation structure of good quality as illustrated in FIG. 2 can be obtained by performing unidirectional solidification through use of a melt in which the material of the first phase and the material of the second phase are mixed in the vicinity of a eutectic composition ratio (±5 mol %). As a specific method for unidirectional solidification, the Bridgman method or the like can be used.

When the composition ratio between the material of the first phase and the material of the second phase deviates from the range of eutectic composition ±5 mol %, one of the crystal phases is first precipitated, leading to a factor for disturbing the phase separation structure of good quality of the scintillator crystal from the viewpoint of the formation of the phase separation structure. However, even when the composition ratio between the material of the first phase and the material of the second phase deviates from the range of eutectic composition ±5 mol %, a scintillator crystal having the phase separation structure of good quality may be obtained in some cases depending on the method of solidification when the composition ratio falls within the range of eutectic composition ±10 mol %.

Thus, even when the composition ratio between the material of the first phase and the material of the second phase deviates from the range of eutectic composition ratio ±5 mol %, as long as the first phase and the second phase form a eutectic, to thereby form a phase separation structure, this structure is regarded as a eutectic phase separation structure.

Even when the composition ratio of a melt does not fall within the range of eutectic composition ratio ±5 mol % at a time of formation of a eutectic phase separation structure, the excessive material of the material of the first phase and the material of the second phase may be first precipitated, and the remaining melt may fall within the range of eutectic composition ratio ±5 mol %. In this case, the phase separation structure is disturbed at the beginning of solidification, but the phase separation structure of good quality can be obtained along the way. Therefore, it is sufficient that a portion in which the structure is disturbed be appropriately cut off. That is, a load value is not necessarily required to be matched with the composition ratio of the eutectic phase separation structure and may be slightly different therefrom.

In the case of the above-mentioned $GdAlO_3$, an emission wavelength changes depending on the kinds of elements of emission centers. Specifically, for example, $Tb^{3+}$, $Eu^{3+}$, and $C^{3+}$ that are rare-earth elements can be used as the emission centers. Elements containing those ions are not limited to a simple substance, and it is sufficient that those elements be contained and a compound containing those elements be added as the emission centers. Further, in order to enhance emission efficiency, it is preferred that $GdAlO_3$ contain the emission centers in an amount of 0.001 mol % or more.

When a plurality of kinds of emission centers are added, it is sufficient that the total amount of the emission centers be 0.001 mol % or more. The addition elements serving as the emission centers are added so as to substitute a Gd site of $GdAlO_3$ that is the first phase. When the addition elements are represented by a general formula RE, the composition ratio between $Gd_{1-x}RE_xAlO_3$ and $Al_2O_3$ is 46:54 (mol %).

When $Tb^{3+}$ is used as the emission center, a green emission peak is exhibited in the vicinity of 545 nm. Further, when $Eu^{3+}$ is used as the emission center, a red emission peak is exhibited in the vicinity of 615 nm. Further, when $Ce^{3+}$ is used as the emission center, broad ultraviolet light emission is exhibited in the vicinity of 360 nm. In this way, when addition elements are appropriately selected, a scintillator having various emission wavelengths can be obtained. Further, as the addition elements, other rare-earth elements (Pr, Nd, Pm, Sm, Dy, Ho, Er, Tm, and Yb) may also be selected.

When a scintillator having the above-mentioned phase separation structure is used, a radiation detector that realizes a high resolution can be obtained. Meanwhile, a decrease in resolution caused by the incidence of X-rays along the adhesive layer appears more remarkably in a radiation detector having a high resolution. That is, about 10 μm of a dead region caused by the adhesive layer, which can be relatively ignored in a radiation detector having a resolution of about 100 μm, is observed remarkably as a defective pixel in a radiation detector having a resolution of 10 μm or less, for example, about 2 μm.

In the present embodiment, the influence of a defective pixel caused by the adhesive layer is reduced by tiling scintillator crystals with the adhesive layer of the scintillator being tilted with respect to the incident direction of radiation. As illustrated in FIG. 1, the scintillator plate 101 includes the plurality of scintillator crystals 102 (102a to 102e). The two adjacent scintillator crystals 102 are tiled and fixed through intermediation of the adhesive layer. In this case, when the adhesive layer is tilted with respect to the incident direction of radiation, the scintillator crystals 102 are tiled so that emitted light of the scintillator crystal close to the incident direction of radiation is guided to the scintillator crystal far away from the incident direction of radiation.

Figure 3:
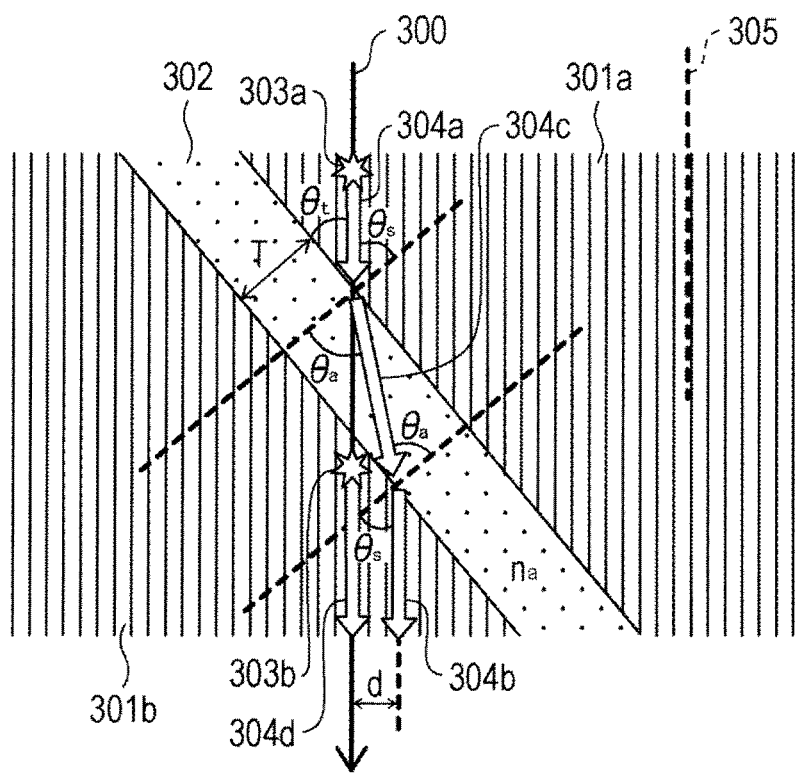
FIG. 3 is a view for illustrating waveguiding of emitted light of an adhesive layer according to one embodiment of the present invention.

Now, the light guiding in the adhesive layer is described in detail with reference to FIG. 3. Radiation 300 enters a scintillator crystal 301a to generate scintillation emission light at an emission point 303a. The incident direction of the radiation 300 is matched with the waveguiding direction of the scintillator crystal 301a, and emitted light 304a guided through the scintillator crystal 301a enters an adhesive layer 302 along the waveguiding direction matched with a center axis 305 of the scintillator crystal 301a.

When the refractive index of the first phase of the scintillator crystal 301a is represented by $n_s$, the refractive index of the adhesive layer 302 is represented by $n_a$, the incident angle from the scintillator crystal 301a to the adhesive layer 302 is represented by $\theta_s$, and the incident angle from the adhesive layer 302 to the scintillator crystal 301b is represented by $\theta_a$, there is a relationship: $\sin\theta_s \times n_s = \sin\theta_a \times n_a$ based on the Snell's law.

Here, in particular, when a GdAlO$_3$—Al$_2$O$_3$ eutectic is used as the scintillator crystal, the emitted light 304a is guided through GdAlO$_3$ (refractive index: 2.05) serving as the first phase and enters the adhesive layer 302. As the adhesive layer 302, for example, an epoxy resin (refractive index: 1.55 to 1.61), a melamine resin (refractive index: 1.6), polystyrene (refractive index: 1.6), a vinylidene chloride resin (refractive index: 1.61), polycarbonate (refractive index: 1.59), or the like can be used.

The refractive index of GdAlO$_3$ is high as described above, and hence an adhesive layer to be used generally has a relatively low refractive index. Thus, emitted light 304c guided through the adhesive layer 302 is bent so as to satisfy $\theta_a > \theta_s$.

It is assumed that a tiling angle $\theta_t$ corresponds to the tilt of the adhesive layer 302 with respect to the center axis 305 of the scintillator crystal 301a, and a relationship: $\theta_t = 90 - \theta_s$ is satisfied. When the incident angle $\theta_s$ is larger than a critical angle, that is, the tiling angle $\theta_t$ is too small, the emitted light 304a is totally reflected without entering the adhesive layer 302. Thus, there is a critical tiling angle $\theta_{tc}$ at which the emitted light 304a guided through the scintillator crystal 301a can be guided to the scintillator crystal 301b through tiling, and the critical tiling angle $\theta_{tc}$ is represented by the following expression: $\theta_{tc} = 90 - \sin^{-1}(n_a/n_s) = \cos^{-1}(n_a/n_s)$. It is necessary that the tiling angle $\theta_t$ be larger than the critical tiling angle $\theta_{tc}$.

When a GdAlO$_3$—Al$_2$O$_3$ eutectic scintillator crystal is used as the scintillator crystal, the refractive index $n_s$ is 2.05. When the above-mentioned resin is used as the adhesive layer 302, the critical tiling angle $\theta_{tc}$ at the refractive index $n_a$ of 1.5 is 43.0°, the critical tiling angle $\theta_{tc}$ at the refractive index $n_a$ of 1.6 is 38.7°, and the critical tiling angle $\theta_{tc}$ at the refractive index $n_a$ of 1.7 is 34.0°. As the refractive index of the adhesive layer 302 increases, the critical tiling angle $\theta_{tc}$ decreases.

The emitted light 304c guided through the adhesive layer 302 enters the scintillator crystal 301b and is refracted. Then, the emitted light 304c becomes emitted light 304b guided through the scintillator crystal 301b and is detected by a light receiving element. Meanwhile, the radiation 300 generates scintillation emission light also at an emission point 303b. Then, the scintillation emission light generates emitted light 304d guided through the scintillator crystal 301b, and the emitted light 304d is detected by a light receiving element.

As described above, due to the adhesive layer 302 interposed between the two scintillator crystals, the emitted light 304b and the emitted light 304d generated from the same radiation 300 enter the light receiving elements at different positions. A shift amount d between the emitted light 304b and the emitted light 304d is represented by the following expression: $d = T/\cos\theta_a \times \sin(\theta_a - \theta_s)$, where T represents the thickness of the adhesive layer 302.

Figure 4A:
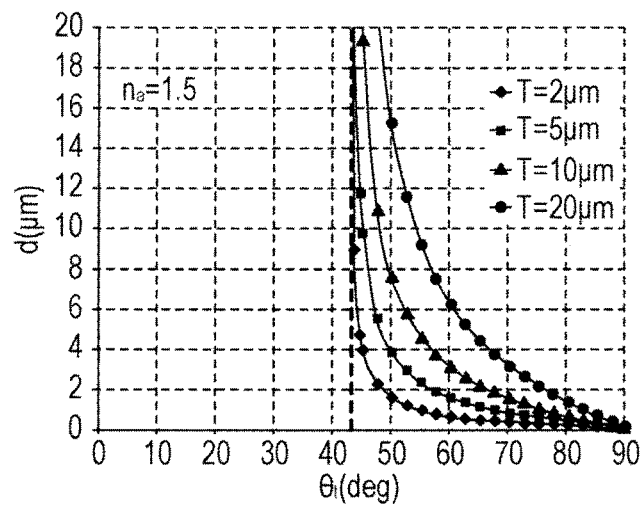
FIG. 4A is a graph for showing a relationship between a shift amount of X-rays and a tiling angle according to one embodiment of the present invention.
Figure 4B:
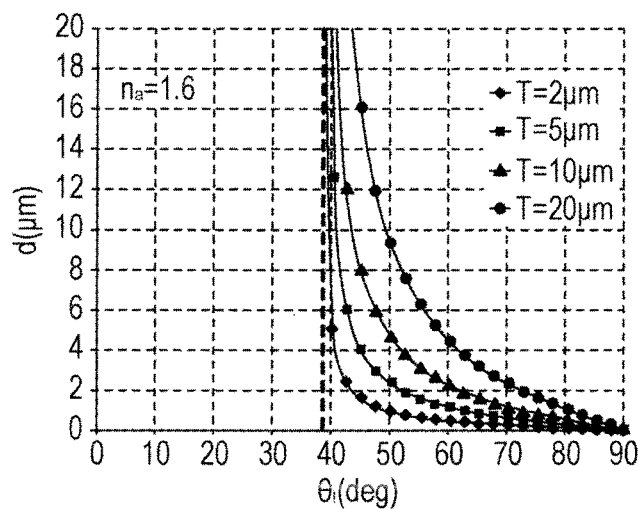
FIG. 4B is a graph for showing a relationship between a shift amount of X-rays and a tiling angle according to one embodiment of the present invention.
Figure 4C:
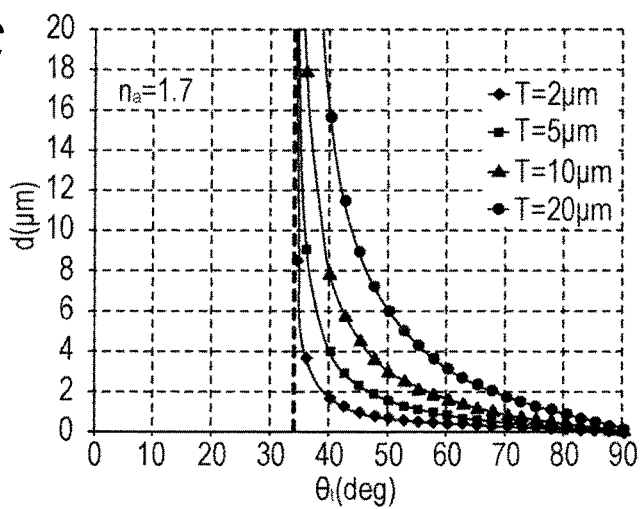
FIG. 4C is a graph for showing a relationship between a shift amount of X-rays and a tiling angle according to one embodiment of the present invention.

In FIG. 4A to FIG. 4C, there are shown results obtained by calculating the tiling angle $\theta_t$ and the shift amount d, when a GdAlO$_3$—Al$_2$O$_3$ eutectic is used as a scintillator layer and an adhesive layer having $n_a$ of 1.5, 1.6, or 1.7 is used, with respect to the case where the thickness T of the adhesive layer is 2 μm, 5 μm, 10 μm, and 20 μm. It is understood that, as the refractive index $n_a$ of the adhesive layer increases, and as the thickness T of the adhesive layer decreases, the shift amount d tends to decrease. Here, when the shift amount d is set to be smaller than one pixel of a light emitting element, substantial blurring can be removed.

The GdAlO$_3$—Al$_2$O$_3$ eutectic scintillator has a high resolution, and a high-resolution sensor having a pixel size of, for example, about 2 μm can also be used. In this case, for example, when the adhesive layer having a refractive index $n_a$ of 1.6 is used, in order to set the shift amount d to 2 μm or less with respect to the thicknesses T of 2 μm, 5 μm, 10 μm, and 20 μm, it is necessary that the tiling angle $\theta_t$ be set to be larger than 43°, 52°, 62°, and 72°, respectively.

When the radiation 106 is regarded as not perpendicularly entering the radiation detector 100, the radiation enters the radiation detector 100 more diagonally as separating from the center portion of the scintillator plate toward the peripheral portion thereof. Therefore, the decrease in resolution of the peripheral portion can be reduced by tilting the center axis of the scintillator crystal in accordance with the diagonal incidence. In this case, the center axes 107a to 107e of the scintillator crystals are not matched with each other and are tilted more inwardly toward the peripheral portion.

Even when the center axes of the adjacent scintillator crystals are not matched with (not parallel to) each other, the present embodiment can be similarly applied to this case by setting the tiling angle $\theta_t$ to the tilt of the adhesive layer with respect to an intermediate value of the center axes of the adjacent scintillator crystals. In this case, when the tiling angle $\theta_t$ between the scintillator crystals is set to be constant over the entire scintillator plate, the angle of the adhesive layer with respect to the detection unit 103 is not uniform over the entire scintillator plate.

The detection unit 103 illustrated in FIG. 1 includes the substrate 104 and the plurality of light receiving elements 105. The light receiving elements 105 are arranged on the substrate 104 so as to have two arrangement directions (typically, an x-axis direction and a y-axis direction). There is no particular limitation on the light receiving element 105 as long as the light receiving element 105 has a light receiving surface and is configured to detect the intensity of light having entered the light receiving surface, and a CCD image sensor, a CMOS image sensor, or the like can be used.

There is no particular limitation on the pixel size of the light receiving element 105. However, when the pixel size is 20 µm or less, the effect of reducing the decrease in resolution, which is provided by the adhesive layer according to the present embodiment, is particularly large. The pixel size is preferably 10 µm or less because the effect is even larger in this case.

In FIG. 1, the scintillator crystal 102 and the light receiving elements 105 are held in contact with each other, but may not be held in contact with each other. For example, a protective film may be formed between the scintillator crystal 102 and the light receiving elements 105 so that the radiation having passed through the scintillator crystal 102 does not enter the light receiving elements 105. Further, it is desired that the plurality of light receiving elements 105 arranged on one substrate 104 be used as the detection unit 103. However, a plurality of substrates each having a plurality of light receiving elements arranged thereon may also be combined to be used.

Figure 5A:
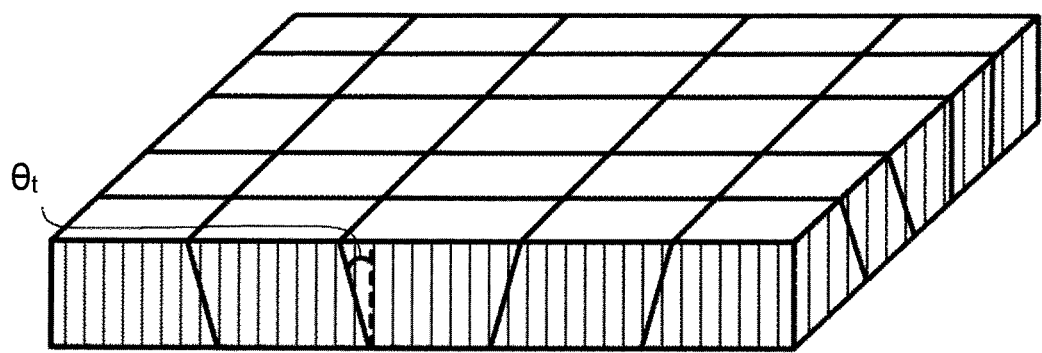
FIG. 5A is a view for illustrating an example of arrangement of scintillator crystals according to one embodiment of the present invention.

Next, the specific arrangement manner of the scintillator crystals is described. When square crystals are squarely arranged, for example, as illustrated in FIG. 5A, the crystals are tiled so that the adhesive layer between the adjacent crystals have a tiling angle larger than the above-mentioned critical tiling angle $\theta_{tc}$. In FIG. 5A, the tiling angles $\theta_t$ are formed so as to be symmetrical with respect to the center portion of the scintillator plate, but all the adhesive surfaces may be tilted in the same direction. It is preferred that the adhesive layer be tilted with respect to the incident direction of radiation, and the radiation travels substantially in parallel to the thickness direction of the scintillator plate or travels so as to spread as X-rays 61 of FIG. 6. Thus, as illustrated in FIG. 1, it is preferred that the adhesive layers be tilted so that the center axes thereof cross each other when the center axes are extended toward the detection unit 103.

Figure 5B:
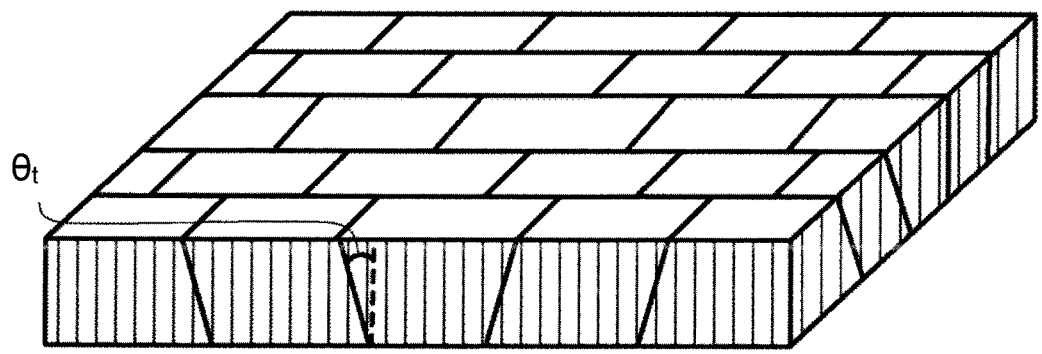
FIG. 5B is a view for illustrating another example of arrangement of scintillator crystals according to one embodiment of the present invention.

Further, in order to eliminate sides at which the adhesive layers of four crystals are overlapped on each other, the crystals may also be squarely arranged so that the adhesive layers are shifted alternately as illustrated in FIG. 5B. Further, crystals cut out into a polygonal shape may also be arranged. Further, the adhesive layer may not have a flat shape and have a curvature as long as the tiling angle is larger than the critical tiling angle $\theta_{tc}$.

Now, a specific example of the present embodiment is described.

Example 1

In this Example, description is given of a specific example of a method of producing a scintillator crystal and an image pickup result of X-rays when produced scintillator crystals are tiled with the adhesive interface being tilted.

In this Example, each scintillator crystal is a eutectic phase separation scintillator crystal containing $GdAlO_3$ as the material of a plurality of first phases and $Al_2O_3$ as the material of a second phase, and contains $Tb^{3+}$ as an emission center. A method of producing such eutectic phase separation scintillator crystal is described.

First, $Gd_2O_3$, $Tb_4O_7$, and $Al_2O_3$ were weighed so that the composition ratio between the material, which was obtained by adding 8 mol % of $Tb^{3+}$ to $GdAlO_3$, and $Al_2O_3$ reached 46:54 (mol %). Then, those powders were sufficiently mixed and defined as raw material powders.

Those raw material powders were placed into an Ir crucible. Then, the crucible was heated to 1,700° C. by induction heating, to thereby dissolve the entire sample. The entire sample was held for 30 minutes after being dissolved, and then, subjected to unidirectional solidification at a speed of 18 mm/h, to thereby grow the sample. The sample thus produced was cut out to have dimensions of 2.5 mm×5 mm×500 µm (thickness), and both surfaces thereof were polished.

This sample exhibited a green emission peak in the vicinity of 545 nm through X-ray irradiation. Two produced samples were caused to adhere to each other through use of an adhesive having a refractive index of 1.5 so that the tiling angle $\theta_t$ of an adhesive layer reached 60°, to thereby provide a sample having dimensions of 5 mm×5 mm×500 µm (thickness). Further, for comparison, a sample having a tiling angle $\theta_t$ of 0° was also prepared.

The sample having a tiling angle $\theta_t$ of 60° was observed with a scanning electronic microscope, and it was confirmed that the sample had a phase separation structure in which an indefinite number of $GdAlO_3$ columnar structures each having a diameter of about 1.2 µm were buried in the $Al_2O_3$ phase. The thickness of the adhesive layer was about 10 µm. In general, the thickness of the adhesive layer falls within a range of from 3 µm to 30 µm.

For evaluation, a line-and-space grating made of gold and silicon, having a period of 8.2 µm, was used as an object, and the resolution of the adhesive layer was evaluated based on an X-ray image. As an evaluation system, an X-ray image pickup system was used, which was capable of acquiring an image having a resolution of one pixel of 0.65 µm by magnifying a light extraction surface of a scintillator crystal with a lens and forming an image onto a charge-coupled device (CCD) serving as a two-dimensional light receiving element. As a radiation source, an X-ray source of a tungsten tube was used. The radiation source was arranged such that X-rays perpendicularly enter the scintillator crystal, and X-rays obtained under the conditions of 40 kV, 0.5 mA, and the presence of an Al filter were used for image pickup.

In the sample having a tiling angle $\theta_t$ of 60°, a pattern of 8.2 µm (corresponding to 122 line pair/mm) was clearly resolved even in a region including the adhesive layer, and an X-ray image in which the pattern of 8.2 µm continued without being disconnected was acquired. Meanwhile, in the sample having a tiling angle $\theta_t$ of 0° for comparison, a region corresponding to the adhesive layer had a relatively low refractive index with respect to the scintillator crystal in addition to the thickness of about 10 µm of the adhesive layer. Therefore, the region served as a waveguide for emitted light leaking from total reflection, and the incident light amount of scintillation light was significantly saturated, with the result that there was a region in which the pattern of 8.2 µm was not resolved over about 20 µm.

As described above, the scintillator crystal having a phase separation structure has a waveguiding property like an optical fiber. Therefore, when such scintillator crystal and a high-resolution sensor having a pixel size of several μm are used, an X-ray image can be acquired with a high space resolution capable of resolving an image by several μm. However, an X-ray image can be acquired at a high resolution, and hence the adhesive layer to be tiled is also formed into an image. Thus, when the tiling angle is appropriately set, and adjacent scintillator crystals are tiled while being tilted as in this Example, a radiation detector capable of resolving a pattern of about several μm over an entire region can be manufactured.

Example 2

In this Example, description is given of a specific example in which the radiation detector of Example 1 is used as a detector of an X-ray Talbot interferometer serving as a radiation measurement system.

Figure 6:
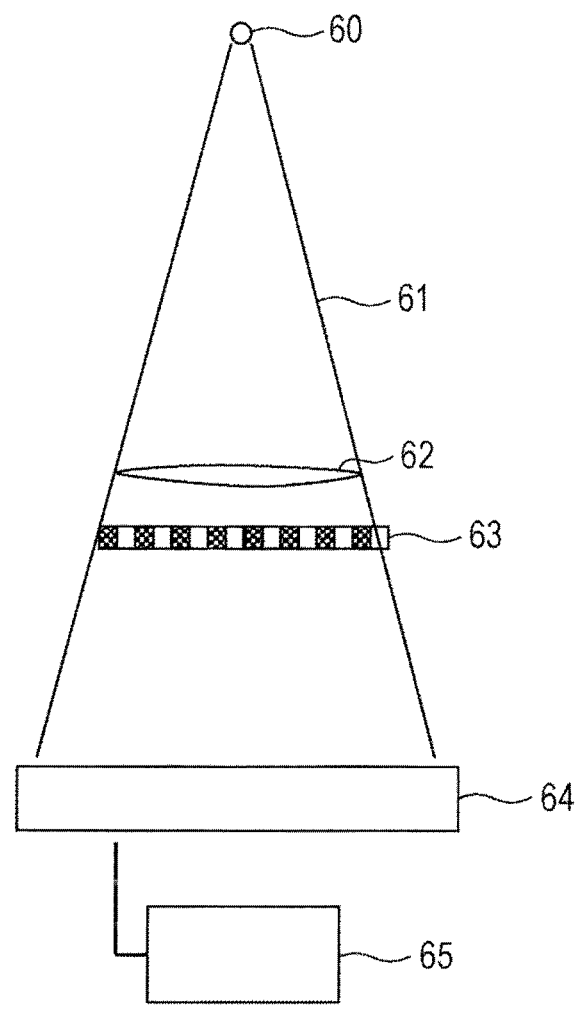
FIG. 6 is a schematic view of an example of a radiation measurement system according to one embodiment of the present invention.

FIG. 6 is a schematic view for illustrating an X-ray Talbot interferometer of this Example. The X-ray Talbot interferometer includes an X-ray source 60, an X-ray diffraction grating configured to diffract X-rays 61 from the X-ray source 60 to form an interference pattern, an X-ray detector 64 configured to detect the X-rays 61 forming the interference pattern, and a computing device 65 configured to obtain information on a subject 62 to be examined, through use of the result of detection by the X-ray detector 64.

The X-ray Talbot interferometer is described in detail in a large number of documents, for example, International Publication No. 2010/050483, and hence the detail thereof is omitted. A general Talbot interferometer has a grating called a shield grating or an absorption grating arranged at a position where the interference pattern is to be formed, and is configured to obtain information on an interference pattern having a period of about several μm by forming a moire.

Meanwhile, the X-ray Talbot interferometer of this Example includes the radiation detector of Example 1 as the X-ray detector 64. Therefore, when the X-ray detector 64 is arranged at a position where an interference pattern is to be formed, the contrast of the interference pattern can be directly observed with the X-ray detector 64. Thus, information on the phase, scattering, and absorption of the subject 62 can be obtained by analyzing a change in interference pattern caused by the subject 62, through use of the result of detection by the X-ray detector 64.

The other items such as the X-ray source, the diffraction grating, and the method of analyzing an interference pattern with a computing device are the same as those of the general Talbot interferometer. The X-ray Talbot interferometer may include a display unit (not shown) configured to display information on a subject obtained by the computing device 65. Further, the X-ray Talbot interferometer may not include the computing device 65 or the X-ray source 60. In this case, image pickup (acquisition of an interference pattern) with the X-ray Talbot interferometer can be performed through combination of any X-ray source during image pickup.

Examples of the present invention are described above, but the present invention is not limited to Examples and can be modified and changed variously within the scope of the gist thereof.

According to the present invention, there can be provided a scintillator plate capable of reducing the influence of the clearance between scintillator crystals on an X-ray image in a radiation detector using, as a scintillator, a structure including two crystal phases having different refractive indices. Further, a radiation detector including the scintillator plate and a radiation measurement system including the radiation detector can also be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-031747, filed Feb. 23, 2016, which is hereby incorporated by reference herein in its entirety.

The invention claimed is:

1. A radiation detector comprising:
   a scintillator plate, comprising a plurality of scintillator crystals each including a plurality of first phases and a second phase present on a periphery of each of the plurality of first phases; and
   a detection unit configured to detect light from the scintillator plate, the detection unit comprising light receiving elements,
   wherein the each of the plurality of first phases and the second phase are different from each other in refractive index with respect to scintillation light,
   wherein the plurality of scintillator crystals are joined to each other through intermediation of an adhesive layer,
   wherein at least a part of an extension line of a center axis of each of the plurality of scintillator crystals passes through the adhesive layer, and
   wherein $D > T/\cos\theta_{ax} \times \sin(\theta_a - \theta_s)$, where D represents a pixel size of a light receiving element, T represents a thickness of the adhesive layer, $\theta_a$ represents an incident angle from the adhesive layer to a scintillator crystal, and $\theta_s$ represents an incident angle from the scintillator crystal to the adhesive layer.

2. The radiation detector according to claim 1, wherein the plurality of first phases are configured to generate the scintillation light in response to incidence of radiation.

3. The radiation detector according to claim 2, wherein the adhesive layer is tilted with respect to an incident direction of the radiation.

4. The radiation detector according to claim 2, wherein the each of the plurality of first phases comprises a perovskite-type oxide material containing Gd,
   wherein the each of the plurality of first phases contains 0.001 mol % or more of a rare-earth element as an emission center, and
   wherein the second phase comprises alumina.

5. The radiation detector according to claim 4, wherein the each of the plurality of first phases comprises $GdAlO_3$, and the second phase comprises $Al_2O_3$.

6. The radiation detector according to claim 4, wherein the rare-earth element comprises at least one of Tb, Eu, and Ce.

7. The radiation detector according to claim 1, wherein the each of the plurality of first phases has a refractive index $n_s$ that is higher than a refractive index of the second phase,
   wherein the plurality of scintillator crystals are joined to each other through intermediation of the adhesive layer having a refractive index $n_a$, and
   wherein $\theta_t > \cos^{-1}(n_a/n_s)$,
   where $\theta_t$ represents a tilt of the adhesive layer with respect to the center axis of the each of the plurality of scintillator crystals.

8. The radiation detector according to claim 1, wherein the adhesive layer comprises a resin.

9. The radiation detector according to claim 8, wherein the resin comprises any one of an epoxy resin, a melamine resin, a polystyrene resin, a vinylidene chloride resin, and a polycarbonate resin.

10. The radiation detector according to claim 1, wherein the adhesive layer has a thickness of 3 μm to 30 μm.

11. The radiation detector according to claim 1, wherein the each of the plurality of first phases has a columnar shape.

12. The radiation detector according to claim 11, wherein the columnar shape comprises a cylindrical shape.

13. The radiation detector according to claim 12, wherein the each of the plurality of first phases having the cylindrical shape has a diameter of 2 μm or less.

14. The radiation detector according to claim 1, wherein the each of the plurality of first phases is formed by a first material, and the second phase is formed by a second material, and wherein the first material and the second material are capable of being combined to form a eutectic.

15. The radiation detector according to claim 1, wherein the detection unit comprises one of a CCD image sensor and a CMOS image sensor.

16. The radiation detector according to claim 15, wherein the one of the CCD image sensor and the CMOS image sensor has a pixel size of 20 μm or less.

17. A radiation measurement system comprising:

a diffraction grating configured to form an interference pattern by diffracting radiation from a radiation source; and a radiation detector configured to detect the interference pattern, wherein the radiation detector comprises:

a scintillator plate, comprising a plurality of scintillator crystals each including a plurality of first phases and a second phase present on a periphery of each of the plurality of first phases; and a detection unit configured to detect light from the scintillator plate, the detection unit comprising light receiving elements, wherein the each of the plurality of first phases and the second phase are different from each other in refractive index with respect to scintillation light, wherein the plurality of scintillator crystals are joined to each other through intermediation of an adhesive layer, and wherein at least a part of an extension line of a center axis of each of the plurality of scintillator crystals passes through the adhesive layer, wherein $D > T/\cos\theta_a \times \sin(\theta_a - \theta_s)$, where D represents a pixel size of a light receiving element, T represents a thickness of the adhesive layer, $\theta_a$ represents an incident angle from the adhesive layer to a scintillator crystal, and $\theta_s$ represents an incident angle from the scintillator crystal to the adhesive layer.

* * * * *